United States Patent
Kauffman et al.

(10) Patent No.: US 11,637,935 B2
(45) Date of Patent: Apr. 25, 2023

(54) UPDATE AND PROCUREMENT OF TELECOM LINES USING AUTOMATED RECONCILIATION OF DEVICE INFORMATION

(71) Applicant: Tangoe US, Inc., Indianapolis, IN (US)

(72) Inventors: Jordan Kauffman, Indianapolis, IN (US); Joan Schrenkel, Westfield, IN (US); Jessie Leigh Sroka, Westfield, IN (US); Jason Pineda, Indianapolis, IN (US); Scott Carder, Indianapolis, IN (US); Mark Johnson Bailey, Indianapolis, IN (US); Robert King, Westfield, IN (US); Matthew Alan Crouch, Westfield, IN (US)

(73) Assignee: Tangoe US, Inc., Stamford, CT (US)

( * ) Notice: Subject to any disclaimer, the term of this patent is extended or adjusted under 35 U.S.C. 154(b) by 123 days.

(21) Appl. No.: 17/154,643

(22) Filed: Jan. 21, 2021

(65) Prior Publication Data

US 2022/0232130 A1  Jul. 21, 2022

(51) Int. Cl.
| | |
|---|---|
| *H04M 15/00* | (2006.01) |
| *G06F 16/23* | (2019.01) |
| *H04W 4/24* | (2018.01) |

(52) U.S. Cl.
CPC ........ *H04M 15/8083* (2013.01); *G06F 16/23* (2019.01); *H04M 15/43* (2013.01); *H04M 15/46* (2013.01); *H04M 15/60* (2013.01); *H04W 4/24* (2013.01)

(58) Field of Classification Search
CPC .. H04M 15/8083; H04M 15/43; H04M 15/46; H04M 15/60; G06F 16/23; H04W 4/24
USPC .................................................... 455/406
See application file for complete search history.

(56) References Cited

U.S. PATENT DOCUMENTS

| | | | |
|---|---|---|---|
| 7,657,485 B2 | 2/2010 | Daidone et al. | |
| 8,712,878 B2 | 4/2014 | Fisher | |
| 2001/0037269 A1* | 11/2001 | Marsh | H04M 15/80 705/34 |

* cited by examiner

*Primary Examiner* — Huy C Ho
(74) *Attorney, Agent, or Firm* — St. Onge Steward Johnston & Reens LLC

(57) ABSTRACT

A system and method of performing automated reconciliation of devices and features in telecom expense management systems prior to running programs to optimize expense relative to usage or procuring new lines. The reconciliation accessing and carrier systems and devices and using enterprise configurable rules and live data from end point management systems. The system ensures accurate and up to date data is available for processing by downstream robotic process automation systems that perform the procurement/modification of plans and devices.

20 Claims, 14 Drawing Sheets

UPDATE AND PROCUREMENT OF TELECOM LINES USING AUTOMATED RECONCILIATION OF DEVICE INFORMATION

FIELD OF THE INVENTION

The present invention relates to systems and methods for procurement of and updating telecom plans/devices by first reconciling devices and features within telecom expense management systems. Telecom Expense Management data is reconciled with Carrier systems and End point management systems for asset management. The system ensures accurate and up to date inventory data is available for processing by downstream automated procurement bots or other automation systems setup to place procurement or change orders. These automated systems are thus able to successfully complete any required operations such as changing plans and procuring devices or lines without getting blocked due to obsolete, missing, or inaccurate information.

BACKGROUND OF THE INVENTION

The typical corporation's mobile asset use had progressively grown year over year and an increasing number of departments and functions rely upon these devices and services for their day to day business activities. These include mobile phones, tablets, laptops, routers, and hubs, and associated accessories. A growing number of smart IoT devices are also becoming part of the IT spend.

Devices that offer telecommunication services also incorporate voice and data plans, which are sold separately, are unique to the service provider and often unique to devices. These are an essential part of the device and vary from carrier to carrier. They are a primary way of differentiating a carriers offerings.

These devices also incorporate optional features and functions which can be added by service providers to enhance a devices capability and thus the services provided. Examples include voicemail, conference calling, tethering, and more.

Large enterprise customers are often given the opportunity to further tailor these plans and features to corporate specific plans through negotiations with the service provider. The result may be one or more company specific plans for employees from a given service provider that meets the expected needs in the most economical fashion.

In an increasingly connected world, it is no longer only the mobile phones, tablets or wireless routers that have voice and data plans, but an increasing number of IoT devices are also connected to the internet and require voice and data plans to send information to cloud based systems. This connected infrastructure also allows for updates and upgrades of such systems and in many cases even allows for remote configuration or monitoring.

Voice and data plans associated with the many different device types have also become increasingly flexible and customized. Many can differentiate between data types, applications, and time of day. For example, allowing certain types of data, such as video, after hours for free or at reduced rates may be offered.

These voice and data plans are essential to get these devices connected and operational. Devices must be configured with plans and activated to become connected to the outside networks and to be reached.

Once activated, service providers allow changing these voice and data plans and features for active subscribers. There are often rules and regulations for doing so however, that may affect pricing and eligibility. These may well be based on carrier, device type and device vintage, as well as the date of activation or the terms of the engagement.

To change any of these options requires that one have up to date information about the device models and existing features that are currently provisioned and active. With accurate information about what is currently active, the system knows what changes are possible and when they can be made at optimal or minimal cost.

Large enterprises with 1000s of employees, are likely to require daily changes to the inventory of devices and related features. As the users goes about their business, roaming plans must be added for those travelling, devices are inevitably lost, broken, or stolen and must be replaced. People change roles or departments, or job functions and tools change and new plans must be put in place to adapt to the changing requirements.

Many enterprises use a Telecom Expense Management (TEM) system to manage and track these ever evolving expenses. Some may outsource the whole TEM function to a service provider that provides access to a TEM system for its customers.

Such a TEM system can incorporate policies, establish spending limits, preestablish acceptable devices and plans as well as put a chain of approval in place for ordering. These systems may interact directly with carrier systems though APIs (application programming interfaces) to place orders and make changes.

When systems are not up to date however, incompatible plans and accessories may be selected and ordered for devices. Upgrades that are allowable in the system do not work. Choices that are incompatible and out of policy with corporate guidelines are available in the system leading to higher costs and confusion. Telecom orders are often time sensitive and placed to line up with business travel or upcoming events, thus the inability to have an accurate tracking of devices and plans inhibits the ability to modify telecom plans to achieve cost savings. These windows can be missed when additional steps are inserted and ultimately desired changes or procurement can fail. Thus, with inaccurate data, adjustments or changes to telecommunications plans which are desired may be determined based on incorrect data or worse yet, the attempt to change a plan on the basis of incorrect data may result in a rejection of that or may result in costs increasing due to the discrepancy.

Fischer, in U.S. Pat. No. 8,712,878 describes a system for verifying invoices against errors, however, Fisher does not do any in-month verification which would facilitate the enablement of automation systems trying to process changes within a billing period from a TEM system doing procurement or a self-serve portal offering changes to end users in real time.

Daidone, in U.S. Pat. No. 7,657,485 describes a system and method of finding errors and reconciling telecom expenses by looking at call detail records but does not contemplate using those records to change telecommunications plans.

SUMMARY OF THE INVENTION

What is needed then is a system and method that can verify and reconcile local Telecom Expense Management Systems with one or more service provider or carrier systems in-month and automate corrections to these systems in such a way as to allow for automated upgrades, orders, and changes to take place when they run and be determined and executed based on correct information to avoid rejections of plan changes or un-expected costs increases due to inaccurate information about telecommunications devices.

Of key importance is that the improved TEM system can identify actions where these upgrades, orders or changes (e.g. telecom plan changes) are requested or about to run and the TEM system and its improved software will verify/reconcile device information before the activity is accomplished. This can be done by monitoring the various functions which add/drop devices/plans and features and possibly delaying implementation until verification and/or reconciliation/update to device information is done.

What is also needed is a system and method of pulling data from the carrier systems for the reconciliation through API interfaces or RPA (Robotic Process Automation) mechanisms so that this reconciled data can be used in determining telecommunications plan changes.

What is also needed is a system and method of reading updates to a local TEM system that has logic which can automate decision making as to whether to apply the changes, override them or ignore them and then to use this information to determine and apply telecommunications plan changes with telecommunications providers.

Finally, what is also needed is a way of performing the above logic in a customizable fashion that can adapt to a variety of changing customer needs.

It is an object of the present invention to provide a system that can ensure that the internal representation of the devices and features that people have matches reality and matches the operator system and that the operator system is in fact correct.

It is a further object to provide a system which automatically updates to enable downstream automation of automated procurement bots and a system which can handle error correction and provide for learning and improving performance over time based on irregularities and how to detect and overcome them.

These and other objects are achieved by providing a system for automated reconciliation which adjusts and reacts to discrepancies in a telecom expense management and carrier systems so that plan/device adjustments/procurement can be made based on correct device information and so that these plan adjustments can be made in a manner that does not violate policies or otherwise get rejected due to incorrect device information inputs.

In one aspect a method of managing telecommunications devices includes providing software executing on a computer, the software communicates with a plurality of telecommunications devices, each telecommunications device having device information associated therewith in a data store, the device information including device identification information and information indicative of one or more telecommunications plans for each telecommunications device wherein the data store is separate from each data store of a plurality of telecommunications provider servers. The method further includes determining a time for an expected run of a computer program which makes changes to telecommunications plans of one or more of the plurality of devices to reduce costs based on measured telecommunications usage of the plurality of devices. Prior to the run time and with the software, the method includes obtaining updated device information via a telecommunications network from each of said plurality of telecommunications devices and updating data records in data store with the updated device information such that the device information is up to date. After obtaining the updated device information, the method includes running the computer program to determine changes to the telecommunications plans of the one or more of the plurality of devices based on the measured usage by using the device information which is up to date due to the obtaining step and the computer program modifying the telecommunications plans of the one or more of the plurality of devices by transmitting a request to at least one of the plurality of the telecommunications provider servers.

In one aspect the computer program is part of the software. In another aspect the computer program executes on a second computer which is different than the computer. In another aspect the computer program executes on the computer. In still another aspect the device identification information indicative of group consisting of: device operating system, IMEI number, MEI number, SIM card number and combinations thereof. In yet another aspect, the updated device information is indicative of a change of device type for at least one of the plurality of telecommunications devices. In yet another aspect the updated device information changes eligibility of that device for one or more telecommunications plans available for the computer program to select from. In still another aspect also prior to the run time and with the software, the method includes obtaining updated device information via a telecommunications network from the telecommunications provider server and comparing the updated device information from the telecommunications provider server with the updated device information from each of said plurality of telecommunications devices and reconciling the two to determine and make updates to the data records in the data store.

In still other aspects a method managing telecommunications devices comprises providing software executing on a computer which communicates with a plurality of telecommunications provider servers which each communicate with a group of a plurality of telecommunications devices. Each telecommunications device has device information associated therewith in a data store, the device information includes device identification information and information indicative of one or more telecommunications plans for each telecommunications device wherein the data store is separate from each data store of the plurality of telecommunications provider servers. The method further includes determining a time for an expected run of a computer program which makes changes to telecommunications plans of one or more of the plurality of telecommunications devices to reduce costs based on measured telecommunications usage of the plurality of devices. Prior to the run and with the software, the method includes obtaining updated device information via a telecommunications network from one or more of the plurality of telecommunications provider servers and updating data records in data store with the updated device information such that the device information is up to date. After obtaining the updated device information, the method further includes running the computer program to determine changes to the telecommunications plans of the one or more of the plurality of devices by using the device information which is up to date due to the obtaining step and the computer program modifying the telecommunications plans of the one or more of the plurality of devices by transmitting a request to at least one of the plurality of telecommunications provider servers.

In certain aspects the software obtains updated device information for one device from at least two data stores such that the updated device information from one of the two data stores conflicts with the updated device information from another of the two data stores. In still other aspects the software delays transmission of device information to the computer program until update device information is received. In still other aspects the device identification information indicative of group consisting of: device operating system, IMEI number, MEI number, SIM card number and combinations thereof. In yet other aspects the updated device information is indicative of a change of device type for at least one of the plurality of telecommunications devices. In yet other aspects the updated device information changes eligibility of that device for one or more telecommunications plans available for the computer program to select from.

In still other aspects a method of managing telecommunications devices includes providing software executing on a computer which identifies a request to change or add a telecommunications plan for one or more of a plurality of telecommunications devices. The software upon receiving the request communicates with one or more data stores over one or more networks. The data stores have telecommunications plan information and device information stored thereon. The device information includes device identification information indicative of device type and the telecommunications plan information indicative of active lines. The data stores comprise data stores selected from the group consisting of: data stores which are part of the one or more of the plurality of telecommunications devices, telecommunications provider data stores, user identification data stores and combinations thereof. The software, prior to transmitting a response to the request to change or add the telecommunications plan, obtains updated device from the one or more data stores and updating data records in a system data store with the updated device information such that the device information is up to date. The method further includes, after obtaining the updated device information, running the computer program to determine changes or additions the telecommunications plans of the one or more of the plurality of devices based on the updated device information in the system data store and the computer program modifying the telecommunications plans of the one or more of the plurality of devices by transmitting a request to at least one of a plurality of telecommunications provider servers after obtaining said updated device information.

In one aspect the request to change or add a telecommunications plan is generated by a computer program which makes changes to telecommunications plans of one or more of the plurality of telecommunications devices to reduce costs based on measured telecommunications usage of the plurality of devices. In other aspects the request to change or add a telecommunications plan is transmitted to a telecommunications provider server which is associated with the telecommunications provider data store. In still other aspects user identification data store is associated with a human resources identification system computer. In still other aspects a request to change or add a telecommunications plan is transmitted from a procurement program to a telecommunications provider server for a new telecommunications line. In yet other aspects the new telecommunications line is a data only line Other aspects and features of the present invention will become apparent from consideration of the following description taken in conjunction with the accompanying drawings.

DETAILED DESCRIPTION OF THE INVENTION

Figure 1:
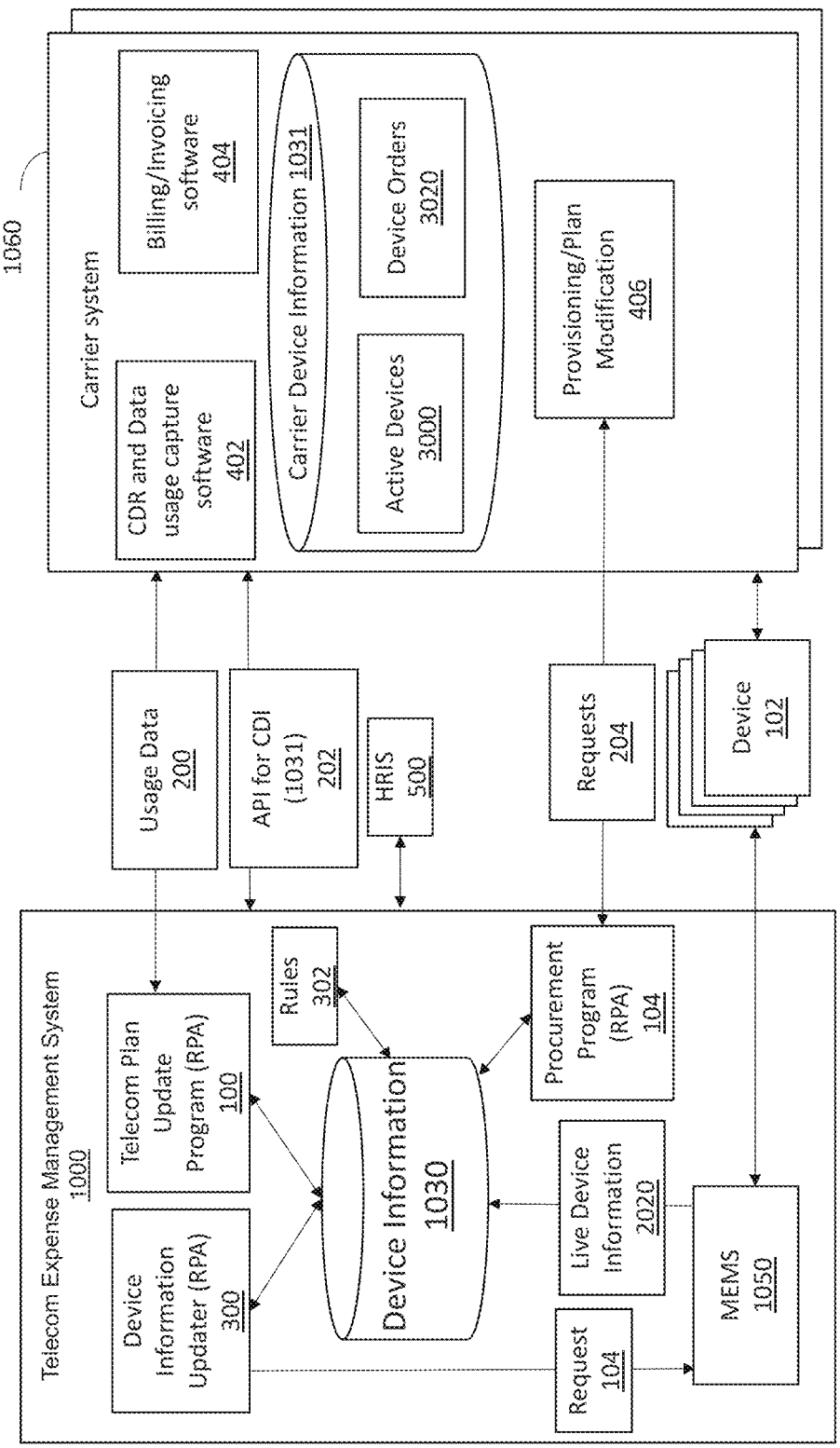
FIG. 1 shows a functional flow diagram of the present system and method.

Referring now to the drawings, wherein like reference numerals designate corresponding structure throughout the views. The following examples are presented to further illustrate and explain the present invention and should not be taken as limiting in any regard.

Referring to FIG. 1, the TEM system 1000 is provided, typically executing on a computer which may include one or more computers such as networked servers and other processors. The TEM system includes a data store with device information 1030 stored thereon. This data store may be local to the servers/computers or may be networked or cloud based. The device information 1030 is used to determine changes to execute at the carrier system 1060 (which is also referred to herein as the telecommunications provider server). The TEM system includes the device information updater 300 software and the telecom plan update program 100 which both use the device information 1030 in different ways. Specifically, the device information is used by the telecom plan update program 100 in order to determine based on usage data 200 what changes should be made at the various carrier systems 1060 to the active devices 3000 and device orders 3020 (the active devices and device orders are stored as part of the Carrier Device information. The plan updater 100 may determine plan changes need and then initiate the procurement program 104 to transmit requests 204 to implement those changes with the information updater 300 having run before those requests 204 are generated so that the requests 204 are generated based on correct device information 1030. The device information updater 300 will monitor when the telecom plan updater 100 runs and ensure that device information 1030 is up to date before that happens. As for procurement software programs 104, the updater 300 can intercept these functions and also seek updates prior to the requests 204 being transmitted to the carrier 1060. Verification at the HRIS 500 can also be accomplished to confirm the device information 1030 does not e.g. assign a line/plan to someone who is no longer an employee or otherwise provide or not provide telecom plans/devices in accordance with company policy.

The device information updates can e.g. be from the API 202 for the Carrier device information 1031, via the MEMS 1050, the HRIS 500 or other systems described herein. The synchronization is completed prior to running processes to optimize or otherwise improve plan selection among devices as described in U.S. Ser. No. 16/587,966, the contents of which are incorporated by reference herein or prior to provisioning new devices/lines/services. Thus, the device information updater 300 will run prior to procurement/change requests 204 and may intercept and delay initiation of such requests to ensure the correct requests are made based on correct data.

To simplify the provisioning and ordering of devices and modifying telecom plans based on usage, an improved a Telecom Expense Management or TEM system 1000 is provided and allows for a standardized and normalized way of ordering equipment and provisioning features within an organization. While the underlying programmatical interface to the carrier systems may vary greatly from carrier to carrier, from a user interface perspective, the improved TEM system provides a uniform and consistent experience minimizing training and simplifying operations.

TEM systems will typically interface with multiple carrier systems in any mid to large enterprise that has staff in multiple geographic regions. The system will therefore have to manage and deal with conflicts in each of these systems when reconciling its content.

Much of the data collection and resolution for purposes of modifying telecom plans and provisioning devices can be accomplished by the improved telecom expense management system 1000. This improved system will recognize events which could trigger failures or problems if incorrect device information is used and then intervene or halt/delay the e.g. provisioning, plan selection/change or other activity until device information can be verified and reconciled across various systems. These are typically software systems which operate on various computers/processors which is used to create and approve telecom related orders within an organization. This may be cloud based and may be managed by an external company to the organization actually using the telecom resources. Typically, users will have access to such a system through a self-service portal. It is used to order devices, features, and plans and to activate or deactivate lines. It will have build in business rules and logic to allow for authorizations and approvals as well as limit what users see to a subset of applicable corporate sanctioned options.

The telcom expense management system will interact with carrier systems 1060 which can also be referred to as telecom provider servers/computers which are used to allow the devices to communicate over various networks and to bill for telecom related services. The data 1031 within this system reflects what the carrier records as valid and up to date data for an account, including what devices users from a particular company have along with features and plans. It is used for billing by the carrier. This system can be used to order equipment, options, and accessories. It can also enable or disable features. In the context of this invention it is accessed by API 200 from the telecom expense management system, although manual intervention may bypass this route and involve direct changes which will later have to be reconciled and synced up between systems.

The telecommunications expense management system 1000 will typically include a program 100 executing on a server/computer of the TEM system which determines and procures changes to telecommunications plans for the various devices 102 the TEM system 1000 manages. This program 100 may also be described as an automated procurement bot which is a robotic software which is related to the telecom expense management system in that it runs as a robotic process automation to fulfil orders when they are placed in the TEM system. This may be part of the TEM system 1000 as shown but may also be standalone in that it executes on e.g. separate computers/servers from the TEM system 1000 and communicates with the TEM system 1000 over a network.

The TEM system will also communicate with a mobile end point management system (MEMS) 1050 (or the same may be considered part of the TEM system. The MEMS 1050 will interacts directly with devices and is able to access certain live information about the devices as well as apply policies including disabling and wiping a device in the case of loss or theft, these systems are sometimes called UEM or MDM systems. A mobile device management or "MDM" will interact directly with devices and is able to access certain live information about the devices as well as apply policies and compliance including enforcement of role based policies, and access controls, it is considered the equivalent or part of to a the mobile end point management system 1050. The MEMS/MDM is sometimes called a unified endpoint management or "UEM" system which interacts directly with devices and is able to access certain live information about the devices as well as apply policies and compliance including enforcement of role based policies, and access controls. The device updater 300 can pull data both from the MDM/MEMS 1050 system directly from the devices 102 and can also pull data via the carrier device information 1031 API 200 which will allow the carrier records related to active devices 3000 and device orders 3020 to be reconciled by the information updater 300. This reconciled information is stored in the TEM system 1000 as device information 1030.

Data can also be pulled from human resources information system 500 or "HRIS" to help resolve conflicts. The HRIS will house information about employee data such as organizations, titles, and positions which can be used to set and manage policies such as approvals, spending limits and plan changes/provisioning/decommissioning. The TEM systems are tied into Human Resource Information Systems or HRIS systems to automate processes for new employees starting and getting them the appropriate equipment needed or giving them access to order it themselves. When employees leave or are terminated, equipment is also deactivated or turned off automatically avoiding lost equipment charges or ongoing charges for unused devices. Again, the updating of device information 1030 using the HRIS 500 data on employees can be used in connection with the verification of device 102 information and carrier device information 1031 and can be used to resolve conflicts or discrepancies between the two.

Using the HRIS based hierarchies and having appropriate knowledge of the organizational structure, rules for approvals are implemented. These may vary by department, for example, sales departments may have roaming plans, and customer service may have unlimited plans. In some departments, managers or directors are required for approvals where in others, employees can make changed directly. Management may allow themselves higher cost devices and plans from typical employees. The allowances may also be based on need or related to whether staff are required to meet clients, suppliers, or partners.

Specific TEM rules aside, once the required internal approvals are done the system allows for the actual order placement and procurement for the features or devices in question. However, as mentioned previously, when the procurement, provisioning or plan changes are to be run with incorrect device information, the robotic software which manages these functions can fail. Worse, the robotic process software designed to make decisions in an autonomous manner and expense saving manner can result in increased expenses by making decisions based on the wrong device information. If for example, we do not have a record of the right device, when the system goes to add an approved feature, plan or accessory and then queries the carrier or operator system, it will not be able to place the order as the selected and approved device, feature or accessory is not available for the device on the line which is actually active. For example, trying to add an Android specific plan to an iOS device will not or should not be permitted. Worse yet, the order may be placed and then the feature is added, charged for but not operating correctly. In the case of an accessory, perhaps the wrong accessory will arrive and be incompatible. This may even potentially cause damage to incompatible equipment such as the wrong charger or cable. In the very least such issued cause frustration and delays resulting in having to process returns and issue replacement orders. With the multitude of changes, it is only expected that some errors may occur. These can be data entry errors, omissions, processing delays, or any number of operational issues in processing the change requests.

Further, the system can get out of sync when people bypass the system and go directly to the vendor and order devices on their own. For example if a device breaks over the weekend, the employees may get creative and put their SIM into another device, or perhaps go directly to the store front of the carrier demanding to upgrade or get a replacement unit.

Not only does this put the device inventory out of sync, potential refunds or insurance claims can be missed or expire without the companies' ability to retrieve these changes in a timely manner and apply the appropriate incentives, refunds which are available as a recourse to them.

Thus, the device information updater 300 can use access to a variety of systems to reconcile and check device information ensuring its accuracy and validity and timeliness. The device information updater 300 will be configured to know what information needs updating depending on what processes are being run. For example, if a particular line is being upgraded to a new phone, the system will look more towards tracking the orders, knowing expected timeframe to activation of the new device and then using access to MEMS 1050 to verify device information 102 to check that the new (replacement) device has been activated. Thus, the device information updater software 300 will use a more targeted approach because the nature of the change or expected action is of relatively narrow scope. This is in contrast to when e.g. an entire billing portfolio is being checked for optimal pooling of devices or selection of plans. A billing portfolio can be considered a set of records for a given customer over a given time-period. One such example could encompass one carrier for one month such as a customer's September Verizon billing portfolio which would include all Verizon devices active for the given month which are being reconciled. When the plan update program 100 is going to be run at e.g. 3 days before the end of the billing cycle at midnight, the device information updater 300 will run e.g. 6 hours in advance and perform updates on the device information 1030 and preferably inform the updater program 100 that the information update is complete. If not complete, the updater program 100 can be delayed a certain amount of time. In this manner last minute telecom plan changes based on usage 200 can be implemented close to the end of a billing cycle but can be applied retroactively in order to maximize savings and avoid a problem where the updater program 100 runs based on incorrect data, causing failures to update telecom plans as expected. Such failures could actually defeat the cost savings purposes of the updater program 100.

Auto resolve rules can be implemented by the updater program 100 to apply sets of rules and/or seek additional device information from other sources to resolve discrepancies using both customizable and non-customizable rules 302 that allow the system to automatically resolve issues with a known set of rules which may be customizable for a particular business customer. When these changes are made to the device information in the TEM system a version history can be logged to provide a historical record of activities performed within the TEM system, similar to an audit trail. For example, if user X logged in and deleted a device in the system, a log of this event can be seen in the version history.

Things which may affect or cause discrepancies and require reconciliation include Device upgrades, contract start and end dates, upgrade dates, plans, SIMs, options, plan changes, sim changes, line assignments, cost centers, labels, number changes and new lines added and lines removed. Each of these will be described below with the potential impact along with situations that can lead to discrepancies requiring reconciliation Device upgrades: When a user replaces the device on record with a newer or different model, this would affect the availability of plans and accessories and features. For example, changing from an Apple device running iOS to an Android phone would not support the same batteries, charging cables, cases, or other accessories tied to the physical nature of the device. Carriers also often have different SIMs across device types rendering existing SIMS and identification data obsolete. Further, plans offered by carriers may be device or at least OS specific, and the porting of any existing plans across incompatible device types would not work, requiring a new plan to be added instead. This is further exasperated by pooled plans where a device may affect a whole pool of other devices if moved from in or out of the pool due to a change of device type.

These discrepancies can occur when users go directly to the carrier when a device breaks or is lost. Another such situation may involve an employee that is called on last minute business trip and wants to add a roaming plan before departure bypassing the usual systems in place using the TEM.

Contract start and end dates, and upgrade dates: These are important dates as they determine when devices and plans are eligible for upgrades or changes. If an upgrade or change is made too early, penalties may apply. If we wait, we miss out on a potential savings. These dates are typically correct in the carrier system, but procurement exception events can also affect these. For example, if a feature or device is ordered but mistakenly remains unfulfilled, dates can get shifted. Similarly, if devices are updated manually such as when users go to the store on their own, these events may not automatically be detected immediately. For example, if a user goes to the store on Saturday to get a replacement device but fails to notify the internal procurement department, this may be detected with a Mobile End Point Management system reconciliation before the end of the month, but the actual date of when the device went into service may not be available.

Plan changes: Changes to plans are important to track as usage charges are validated against the plan which is currently active. Further, in some cases devices that are in a pool plan may affect the whole pool if they are not properly accounted for in the set of pooled devices. Some plans may have eligible features for roaming which affect usage cost. Plans may also be enterprise specific, and have special conditions or limitations based on the negotiated rates and terms SIM changes: When changing from one carrier to another, a new SIM is installed on the device. With number portability, the same phone number can be reused however the reconciliation system must know to track this device in the new carrier system going forward and must also track older charges in the former carrier system in the switch over month. When changes are made in the middle of a billing period, two invoices from two carriers may apply for that device. The system must also ensure that the previous carrier account/line is deactivated and no longer charged after the initial month, and that any termination fees are accounted for where applicable.

Another SIM change situation is when the same SIM is put into another device. This again can be a byproduct of a device falling into disrepair or failure and the user has a spare device or obtains another device. Once again, the new device information can be obtained via the Mobile End Point Management system and verified. In some cases, this is a transient event as a spare device may be used for a short time while the original device is repaired. In other cases, it may be followed with another device change, if the failed device is replaced, and the original temporary replacement is no longer needed. This will be detected as a second SIM change, and all systems will be put into sync at that point.

Option changes: Change to options on a device can also occur which will affect billing and invoicing. The current set of options also affects what is eligible for upgrades and changes. In some cases, options are incompatible with some plans and thus the plan and option data must be kept up to date. If options are enabled on incompatible plans the user may be paying for features, they do not have access to.

Line assignments and cost center changes: These can be made when employees leave the company and their devices are reassigned, or when employees are promoted, change departments, or other organizational structure changes are made in the company. In many cases, companies have policies that vary by department, rank, or organization. These policies will affect which devices and plans are authorized to whom. Labels are also used for line entries and can be set to mimic the person a line is assigned to. This field can also be used to store other information per a customers requirements such as a supervisor, department, or group.

Number changes, lines added, and lines removed: Numbers are often used to reference devices in the system and when phone number changes occur the systems must track references to a given device accordingly. In some cases, a new line is assigned that happened to belong to an active enterprise, leading to a frustrating amount of wrong number calls, in other cases when number portability is used, a temporary number may be assigned to a line while numbers are changed over. Any number of reasons can result in someone wanting to change their phone number.

In cases where companies have outsourced the service of managing their telecom devices, there may still be cases where these customers may have their admins contact the carrier directly. As account owners, the carrier will carry out their instructions. These may include sending bulk upgrades to the carrier, changing a multitude of devices onto a larger plan for example. The customer may neglect to tell the outsourced management company about this change and thus the change will not be reflected in the telecom expense management system used.

In other cases, the customer may contact the outsourced management company letting them know that devices were moved onto a certain plan but specify the wrong plan name. When reconciliation is attempted, the systems do not match.

For billing to be accurate, the carrier systems which house the carriers viewpoint of the device inventory and features must be accurate.

The Telecom Expense Management systems will often limit options shown to the user to reflect what is applicable to their situation. For example, if they can order only 2 types of devices, there is no need to show all 20 available ones that the carrier offers only to have these rejected when trying to approve them. Showing a long list with 18 of 20 listed as 'not allowed' is also more likely to cause frustration and confusion in trying to find the options that are available. Therefore, these systems will often only show the two that are selectable. Similarly, if a user has an Android device and is looking for a roaming feature or plan, there is no need to list plans and features that apply to iPhones, iPads, and other devices, only those applicable to the device known to be in use are displayed. For the Telecom Expense Management system to provide the appropriate options to the user, the system must have an accurate reflection of what the user has.

In general, assuming orders are placed through the TEM system, approved and the orders in the carrier system are initiated, it would be expected that the system retain accurate information which matches the carrier system. That said, as seen above many situations are possible that can lead to discrepancies.

In such cases, when the customer goes to activate a particular feature, the carrier system will reject the order because the feature may not apply to the device listed. If the user has an Android device, but the carrier system says that they actually have a iOS device, any attempt to select or add an Android specific plan will be rejected, despite having made its way through all the necessary approvals within the internal system. Now, the systems are out of sync, a pending order has not been fulfilled, and a resyncing and likely a reordering of appropriate plans will be required.

When this procurement process is automated with an RPA (remote process automation) robot, the process fails. Reconciliation of these systems keeps the data up to date to ensure that the information is accurate and avoids changes to telecom plans being rejected or being requested on the basis of incorrect device information, Below are some of the techniques employed to do reconciliation forming the invention at hand.

The system queries the carrier or vendor systems to reference a point in time. This is typically done via an API 202 and this forms one source of truth, i.e. what the vendor system has on file, and likely what it will use to bill from. When other methods fail to reconcile, this is usually the default position, however it can indeed be in error and actual settings should be validated and verified where possible. In an alternate methodology, the devices 102 themselves can be queried to confirm device types and other device information. This can be done via the MEMS 1050 system. In some cases, both the vendor system (telecommunication provider) and the devices can be queried and the data can be reconciled both for conflicts and for matching in that the vendor/carrier system may not have all the same data as can be obtained directly from the device.

A monthly bill or statement can also be used as a snapshot method for those carrier or vendor systems that do not provide API 202 access to real time data. This can be obtained via the carrier billing software 404. Often, this will be taken from the vendor/carrier system. The ability to get live data from the system in real time is what allows for the most accurate and thorough reconciliation.

The access to such carrier or vendor systems may be through APIs that are offered by the vendor or may be build up using RPA Robotic Process Automation scripts that are capable of accessing and navigating the carrier system portal or user interface to obtain the data in real time.

Activities are also used to look at orders in process. For example, if a new ordering activity has occurred, the carrier system may reflect a new device although the device itself may have been shipped and not received. Even when received, the user may not have gotten around to swapping devices or activating the new device yet. Carriers often provide grace periods for activation which the system uses before forcing any reconciliation. In an example such as this, the mismatch can be ignored. The carrier provisioning/plan modification portal 406 can thus be accessed by the TEM system and more the procurement program 104. It is also understood that the telecom plan update program 100 can communicate with the provisioning/plan modification portal 406.

Version history, or a historical audit trail can also be used to track activities. For example, a missing line in one system may be reflected by an audit trail showing an HRIS system reporting that an employee has left the company. The order to deactivate may not have gone to the carrier system yet. Similarly, orders may have been placed for new devices for people starting in the future, they may be received but not activated. There are various ways these systems can get out of sync.

In another example, a new line may appear in one system that is not present in another. In such a case it may be the result of a number change, or it may be a new line that has been added. The reconciliation system can automatically verify records of number change information, and if the line is found, the discrepancy is ignored. If it is a new line in the carrier system, then the reconciliation system can add this to the telecom expense management system.

In yet another example, say a line we expect to find is missing. In such a case, reconciliation can check to see if there is a record of that number being ported, or whether there is a pending order which has not been fulfilled, or if the line has been cancelled. Finding these records will help establish the appropriate path, but if the line is not found and no record is found the reconciliation system can deactivate and remove this line in the telecom expense management system If for example, we see that a change has taken place on the carrier system, we can check the date that the change was active from and see if this data is more recent than the date in the internal system. While this does not ensure accuracy, as changes may have been made in error, a discrepancy can be used to trigger more in depth reconciliation efforts such as going through the version history audit trail or the activities logs.

Checking the data with a Mobile End Point Management system 1050 in real time to see what device is responding on the system is another approach used. Since the Mobile End Point Management system reads data directly from the device, and a lot of device and SIM data is available from the Mobile End Point Management system, this can be used as a good source of truth by the updater 300.

In some cases, both the TEM system and the Carrier system may be wrong. There may be no discrepancy in data in the two systems but there can still be an error. For example, a user has broken their device, but had an old device of their own or borrowed one from a family member and simply plugged in the SIM. In such a case, both the telecom expense management system and the carrier system would show obsolete information, despite both matching. In such cases, the Mobile End Point Management system data also to compare what is found with the data in the internal systems and this can be used to update carrier and TEM data stores.

Companies may have many lines on their account, typically for corporate devices, all such devices appear on the corporate bill. In some cases, an employee may leave a company and decide to keep their phone number. Other mix-ups on accounts can also occur. But again, when making changes to a line, it is imperative to access the account and to find the appropriate line onto which we want to make these changes. If the line, and mobile phone number identifying the line is thought to be part of a given account but not found, the changes cannot be made.

Device conflicts in identifiers such as the IMEI or MEID or Generic serial number can also occur, this can be due to a manual data entry error or perhaps due to a manual change in the device. Should an employee have a device failure in the evening or over the weekend, they may opt to simply go to the carrier store to get a new device so that they can stay connected. This may not be reflected in the local system.

The live device information 2020 gathered via MEMS 1050 can include e.g. IMEI, MEID, operating system, device type/model, serial number as examples etc.

Device models and how these are identified can also cause a problem. For example, color definitions (black, slate, matte black, etc.) may be improperly identified as can device models. To properly make changes to devices, add accessories or features it is important that the description match in all relevant systems.

Typically, when all else fails to explain a change, the data in the carrier system is considered accurate and updates are made to reflect this in the TEM system with appropriate reporting to record the changes.

Mobile End Point Management systems or other asset management techniques can dynamically query some fields from devices, making them a very accurate source of truth.

For example, a device model can be read from the API of such systems leaving no room for doubt, where as an ordering system or even a billing system are only records of transactions that reflect a historical record of events. The API queries the device directly and retrieves the actual model from the device itself. This method of querying third party systems as part of the reconciliation is a powerful tool to get accurate and timely information as it can be done live.

Update/reconciliation processes may also vary from customer to customer, and even between carriers for the same customer depending on what options the carrier offers, what systems the customer employs as well as the customer policies.

To customize the automatic updates/reconciliation, a table-driven set of rules may be created which can be customized by each customer. This table consists of each of the use cases in columns, such as 'missing device' or 'unexpected device' for example. Each possible situation requiring reconciliation is placed in the columns. This is a comprehensive and exhaustive set of exceptions that can be handled by reconciliation.

The rows of the table reflect the customer and carrier combination. As each carrier may have different rules and timeframes, the way exceptions are handled may vary between carriers. The same customer may also want to react to exceptions differently on a per carrier basis. For example, if one carries has no charge for inactive lines, the customer may be less concerned about applying rules to turn these off.

Finally the content of the cell for each row/column combination in the table has a value reflecting either 0 (zero), which means do NOT apply any rule, or 1 (one) to always apply a default rule, as setup in the TEM system for the given condition. Additionally, numbers greater than 1 are used to create custom rule sets.

A custom rule set is defined by a set of logical and numerical operators which define the rule conditions of when to apply the rule. For example, logic such as 'if variable name is EQUAL to constant' or 'if variable name is LESS THAN a second variable name' etc. can be used.

Essentiall the table allows for the selective application of a given rule set for a customer under a customizable set of conditions. Any number of conditions can be setup and applied using a numerical definition of the condition. For example, if we want a specific set of conditions applied to a department or an individual, we would setup the logical definition for the condition and add this value to the table. Each table entry may have more than one value so that the rule can be applied when multiple conditions are met.

In essence the system is able to retrieve data from the carrier system though supplied APIs or RPA methods, and it is also able to see changes made in a telecom expense management system as well as associated activities, or orders in progress and version histories or audit trans. The system can leverage end point management systems to get direct data from devices. It has automated reconciliation rules that can be applied on a customer by customer basis taking organizational structure and policy into effect. All of this is uses to make decisions and perform actions which make the TEM system accurately reflect the true representation of who has what device, what features, and what plan and that the carrier system matches this reality. By performing this reconciliation of data, downstream TEM related RPAs which perform procurement work successfully without the need for manual intervention.

In one embodiment, the system accesses the companies account information through a software portal provided by the carrier or service provider. Such portals are carrier specific and in companies having services with many carriers, each of the carrier's systems are accessed to obtain the carrier view of the data.

In another embodiment, the system interacts with the telecom expense management system to keep up to date with internal orders that are placed. This system should access and trigger orders in the carrier billing system so as to actually place the orders requested by the users in the appropriate carrier system using the appropriate calls and functions to access that specific carriers system.

In yet another embodiment, the system also interacts with an Mobile End Point Management system which has live access to the devices that are deployed and the system validates the device information retrieved from the carrier system and the internal order system.

Figure 2:
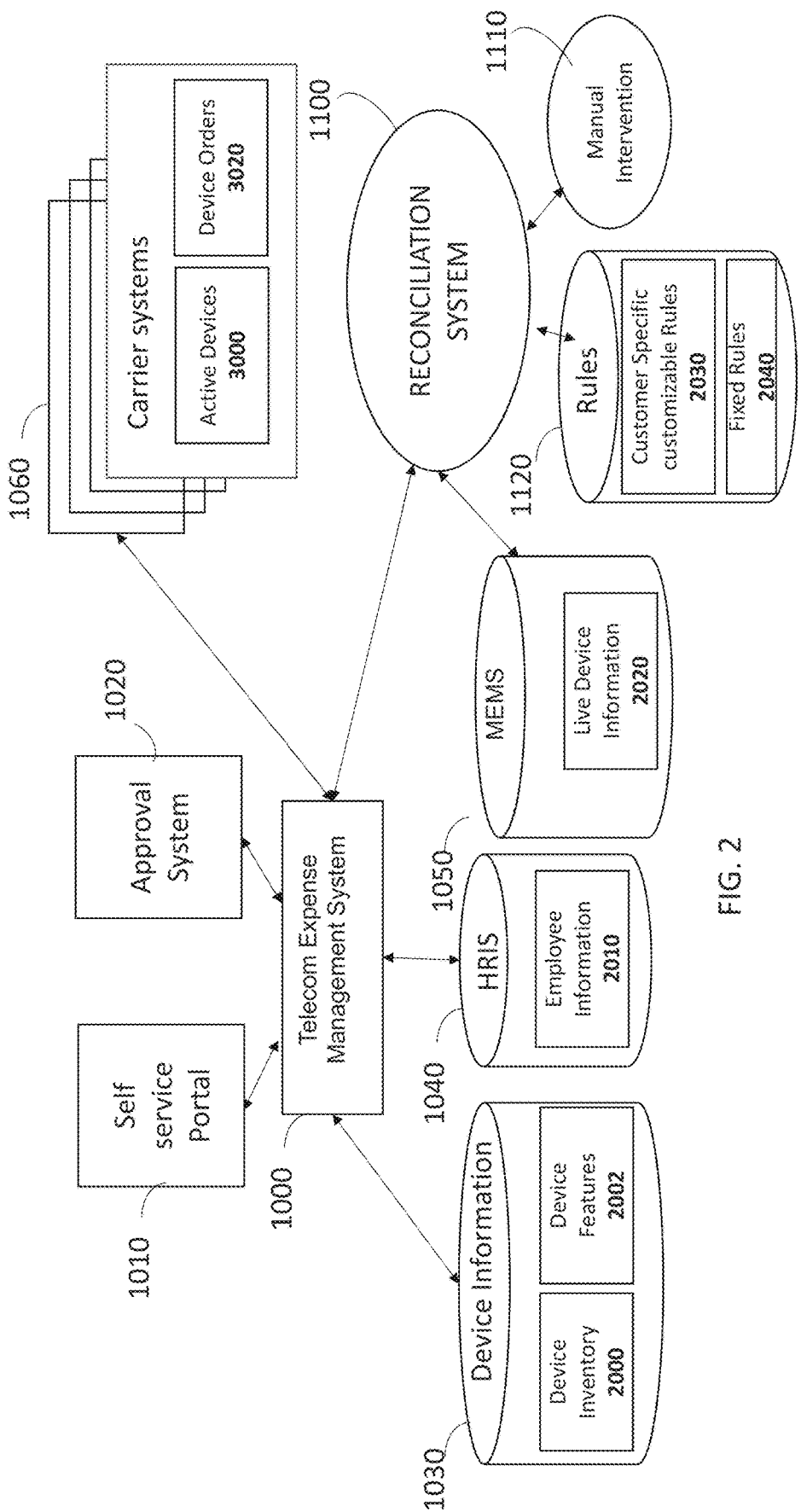
FIG. 2 shows an overview of the various systems related to reconciliation used in FIG. 1.

Turning to FIG. 2, we see a telecom expense management system (1000) which is the main system from which internal employees would order products within the company they work for. This ordering is likely done via self-serve portal (1010) and requests would obtain any necessary approvals through an approval system (1020) which would interact with the various parties such as managers and directors required to make the purchase and upgrade decisions.

The Telecom expense management system (1000) is connected to a human resources HRIS system (1040) where employee information (2010) is housed including roles, positions and corporate organization and policies.

The telecom expense management system (1000) maintains its own device information (1030) information about what devices, accessories, features, and plans are active for all employees. The device information (1030) includes the device inventory (2000) as well as the device feature (2002) inventory.

Further, when orders are placed through the self-service portal (1010) and approved via the approval system (1020), the Telecom expense management system (1000) place orders directly with the appropriate carrier systems (1060).

The Carrier systems (1060) are specific to a given carrier, and each carrier houses its own information consisting of at least the active devices (3000) and any Device orders (3020). In this context, accessories, plans, and features are all contained in the information for Active devices (3000) and any device orders (3020). The carrier system (1060) will separate and aggregate data from all devices for a particular company into an invoice upon which these active devices (3000) would be listed with all the usual monthly charges based on the associated features and plans.

The Reconciliation system (1100) system interacts with the telecom expense management system (1000) employing a set of rules (1120) that are customers specific and customizable (2030) and other reconciliation rules that are fixed (2040). It can also interact with a Mobile End Point Management system (1050) and interrogates these to ensure the device inventories (3000, 2000) are in synchronization. It also queries the Mobile End Point Management system (1050) to obtain live device information (2020) and ensures this matches what is reflected in each of the systems, namely the telecom expense management system (1000) device information (1030) Device inventory (2000) and the Carrier system (1060) active devices (3000) or device orders (3020) databases. Although the reconciliation system 1100 is shown separate from the TEM system 1000, it is understood that the reconciliation system software could execute on its own computer/server/processor or be part of the overall TEM system software executing on the TEM computer.

If the carrier system 1060 and TEM system 1000 are not in synchronization, the reconciliation system (1100) will update the appropriate database, namely the telecom expense management system (1000) device information (1030) Device inventory (2000) and the Carrier system (1060) active devices (3000) or device orders (3020) databases by placing orders or performing updates. Typically, this update is based on the true settings obtained from the Mobile End Point Management system (1050) from the live devices (2020).

In rare circumstances, where live device data (2020) cannot be confirmed from the Mobile End Point Management System (1050), the reconciliation system (1100) will look at the dates when changes were made in each system and look to re-issue orders or changes to ensure synchronization is made and dates match. Failing this, manual intervention (1110) is requested, and orders or updates must be made manually.

Figure 3:
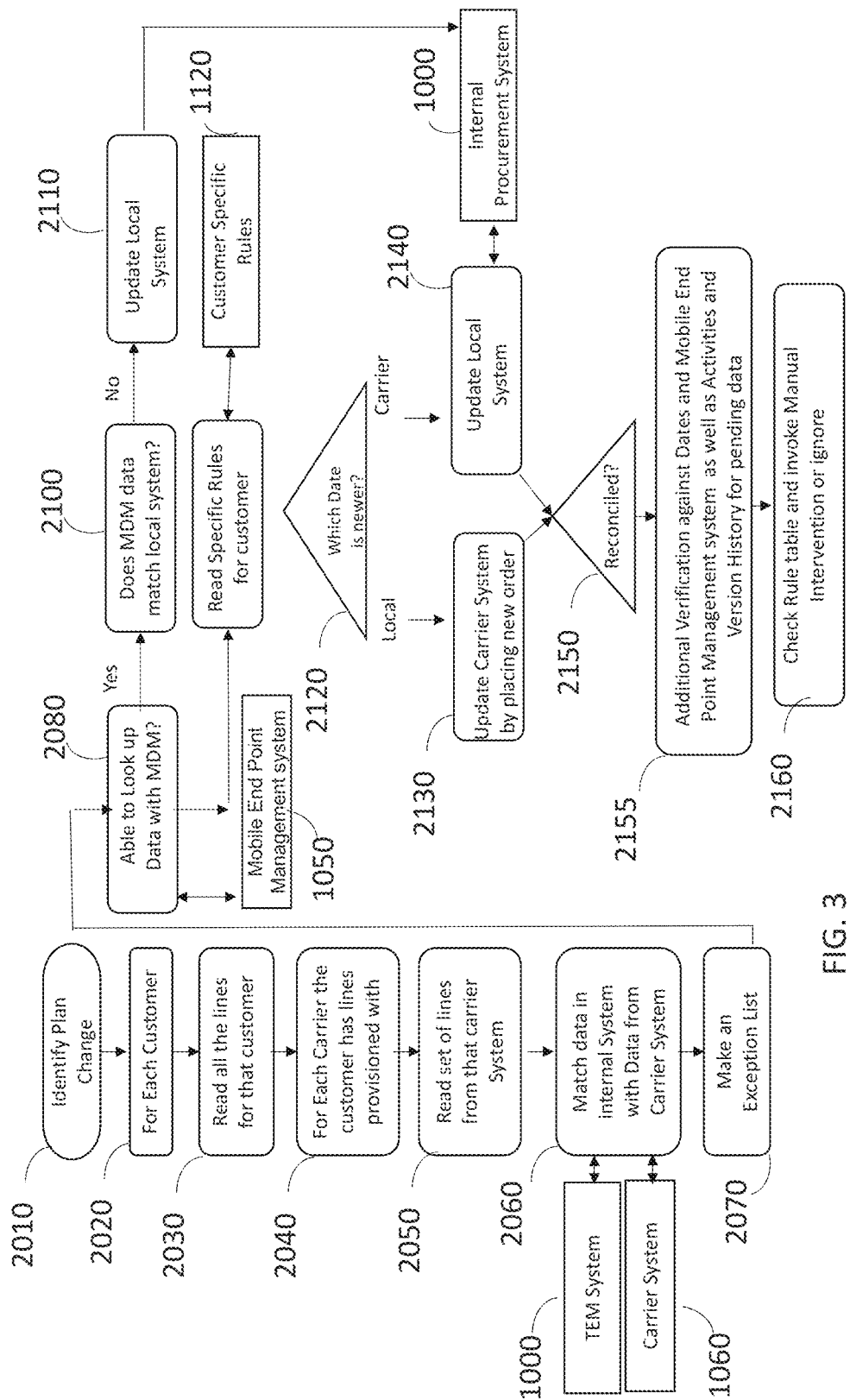
FIG. 3 shows a reconciliation flow chart of where error detection is done and how it is corrected in the system of FIG. 1.

Turning now to FIG. 3. We see a depiction of a high-level reconciliation process. The reconciliation process is initiated by identifying a plan change 2010. This plan change can be that there is a procurement request for a new line. Another option for this identified plan change 2010 would be that the run time of the telecom plan update program 100 is about to occur such that this program 100 is going to run at e.g. 11 pm 5 days before the end of the billing cycle. This program 100 would determine if plan changes should be made for a device or group of devices but would rely upon the device information 1030 being accurate. Thus, the identified plan change 2010 can cause the device information updater 300 to initiate the reconciliation process with enough time to be completed before the plan update program 100 runs. The exemplary reconciliation process proceeds to look at records for each customer (2020) but could also look at only a sub-set of records based on what plan changes/procurement is happening. The reconciliation system may run for multiple customers, such as when a service if offered to customers to do procurement and this system is reconciled. Each of the lines for the customer is read (2030) and this can be one by one, per batch or in their entirety as is most efficient. For each of the lines (2030) it is determined which carriers (2040) are active, and which lines belong to which carrier. The lines for a particular carrier (2050) are now checked with what is in the telecom expense management system (1000) and the specific carrier system (1060)

Items that do not match are put into an exception list (2070). Again, these can be handled one by one or in batches for efficiency. For each exception, we attempt to look up the device in the Mobile End Point Management System (1050) to gather the relevant and available information about the device.

If the UEM system does not match, then the local system, namely the telecom expense management system (1000) is updated to reflect the UEM.

The specific rules (1120) for the customer being processed are read (2115) and are then processed accordingly. A few examples are shown below but these are fully configurable, They may entail authorization levels and other data that was read from the HRIS by the Telecom expense management system (1000). For example, dates can be verified to see what the most recent change made was (2120). If the local copy the one that is more up to date, an order is placed in the carrier system (2130) to reflect this change. This order may be done through automated or manual procurement methods. It may be simply a ticket for someone to make a phone call, a trouble ticket email, or an automated API into an order processing system.

If the carrier system (1060) is the most recent then the local system, namely the telecom expense management system (1000) is updated, If any additional fields do not match, further reconciliation (2150) can is attempted (2155) which includes verification against the activities and version history files to find any pending orders or elements in such audit trails that may explain which actions let to a discrepancy Finally, if unresolvable the rules table is verified and either the discrepancy is ignored, or a manual intervention (2160) is made. Examples to ignore discrepancies can include devices that have been shipped but are still within a grace period to be activated.

Figure 4:
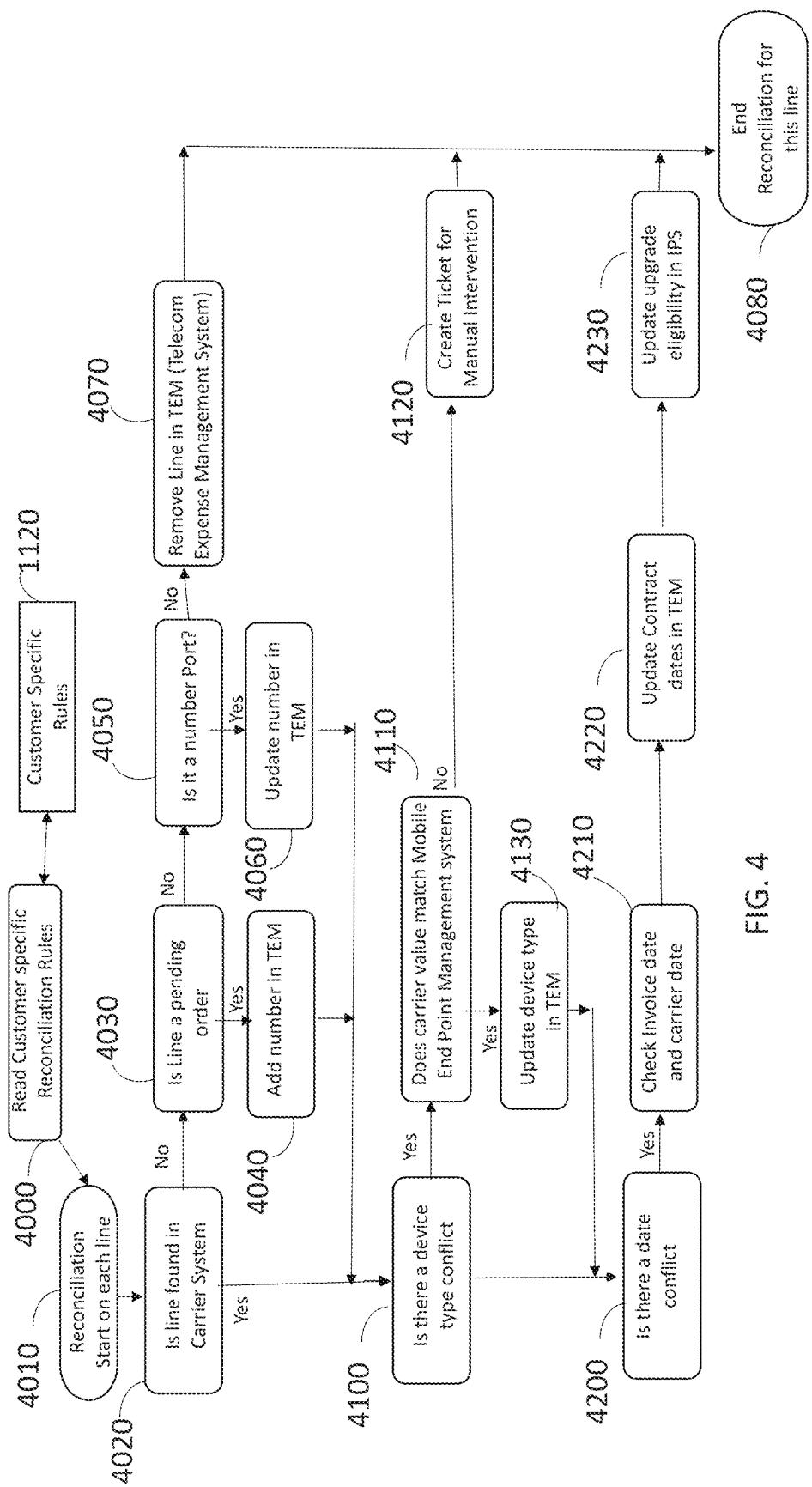
FIG. 4 shows a reconciliation conflict resolution process used in the system of FIG. 1.

The steps above are not meant to be exhaustive and many more reconciliation fields are processed, this high-level flow is intended to provide an overview of the process and methods involved in the reconciliation process, Turning now to FIG. 4 we see some reconciliation conflict resolution examples. Reconciliation starts by reading (4000) the specific reconciliation rules for the given customer (1120) for a given portfolio before starting to process each line sequentially in this example (4010), The system checks to see if the line if found in the carrier system (4020) as expected. If not, verification to see if there is an order pending (4030) is made. If this line is pending, then the line is added to the TEM, or telecom expense management system (4040). If not a pending order, then we check to see if this number was ported (4050), this refers to phone number portability, where someone may change their phone number. If this was a number port, then the new number is updated in the TEM or telecom expense management system (4060. If neither of these cases is true, the line is removed from the telecom expense management system (4070) and reconciliation ends for this line (4080).

If the line was found in the carrier system (4020) then the system checks to see if there are any device type or feature conflicts (4100). If so, the data from the Mobile End Point Management System is checked (4110) and the TEM updates with the actual device data read from the Mobile End Point Management System (4130). Some exceptions may apply if there is a pending order. If the Mobile End Point Management System is not able to retrieve the data, then a manual intervention (4120) is required, and a ticket created leading to the end of the reconciliation for this line (4080)

If a date conflict (4200) exists, then other systems such as checking the invoice and carrier portal account dates (4210) is made. We then match the local dates in the TEM with the carrier dates (4220) and update any upgrade eligibility dates in the TEM (4230) before finishing our reconciliation with a particular line (4080).

Figure 5:
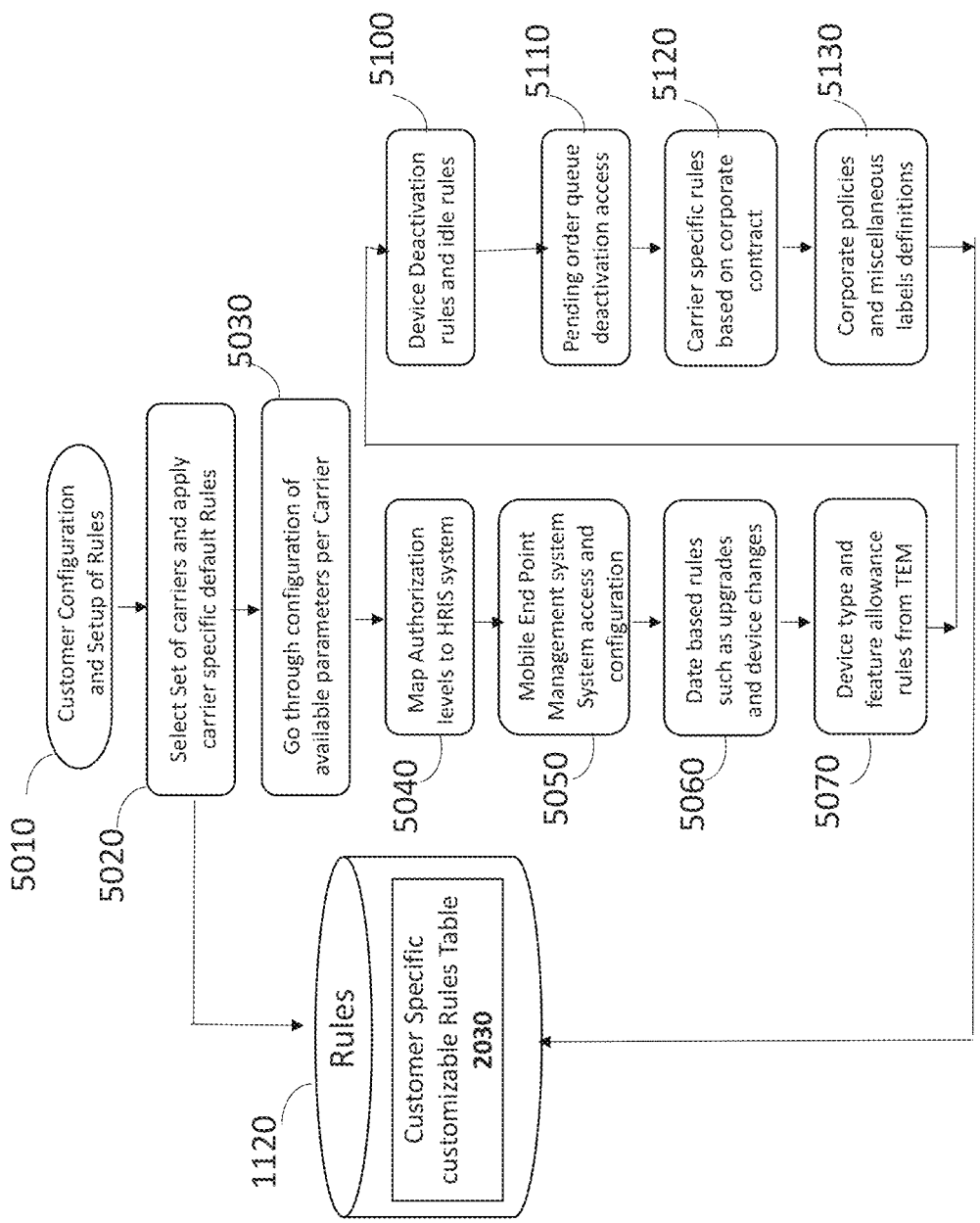
FIG. 5 shows the setup of customer specific rule configuration and setup of the reconciliation system used in the system of FIG. 1.

Turning now to FIG. 5 we see a customer configurable rule setup where rules are determined for a specific customer being provisioned for reconciliation.

The customer setup (5010) begins with the selection of the carriers (5020) that are used by the customer. This creates a default set of rules (1120) which are written as customer specific rules (2030) by default, knowing what is configurable for those specific carriers.

The system then goes through the configurable set of parameters (5030) mapping knowledge of the HRIS system (5040) as pertaining to corporate hierarchy and organizational structures and how these affect the rules (1120). Further, if a UEM is employed by the company, the access (5050) is setup along with the available data that can be obtained from the UEM for reconciliation purposes.

Rules such as date-based rules (5060), device and feature rules (5070), deactivation and idle time (5100) are configured to the company's preferences. Access to any pending order queues or deactivation process queues (5110) is granted so that discrepancies can be checked against any pending changes that have already been provisioned in external systems Finally, carrier specific rules (5120) based on carrier allowances and corporate preferences are set and corporate polices (5130) are configured along with any ad-hoc labels that may be setup in the systems. Example include setting a label for a department, owner, or group name.

Once these rules have been configured, the updated profile for the customer is written to the rules (112) database as a customer specific customization (2030). This complements any existing non-customizable rules (2040) which may be also set for reconciliation.

Figure 6:
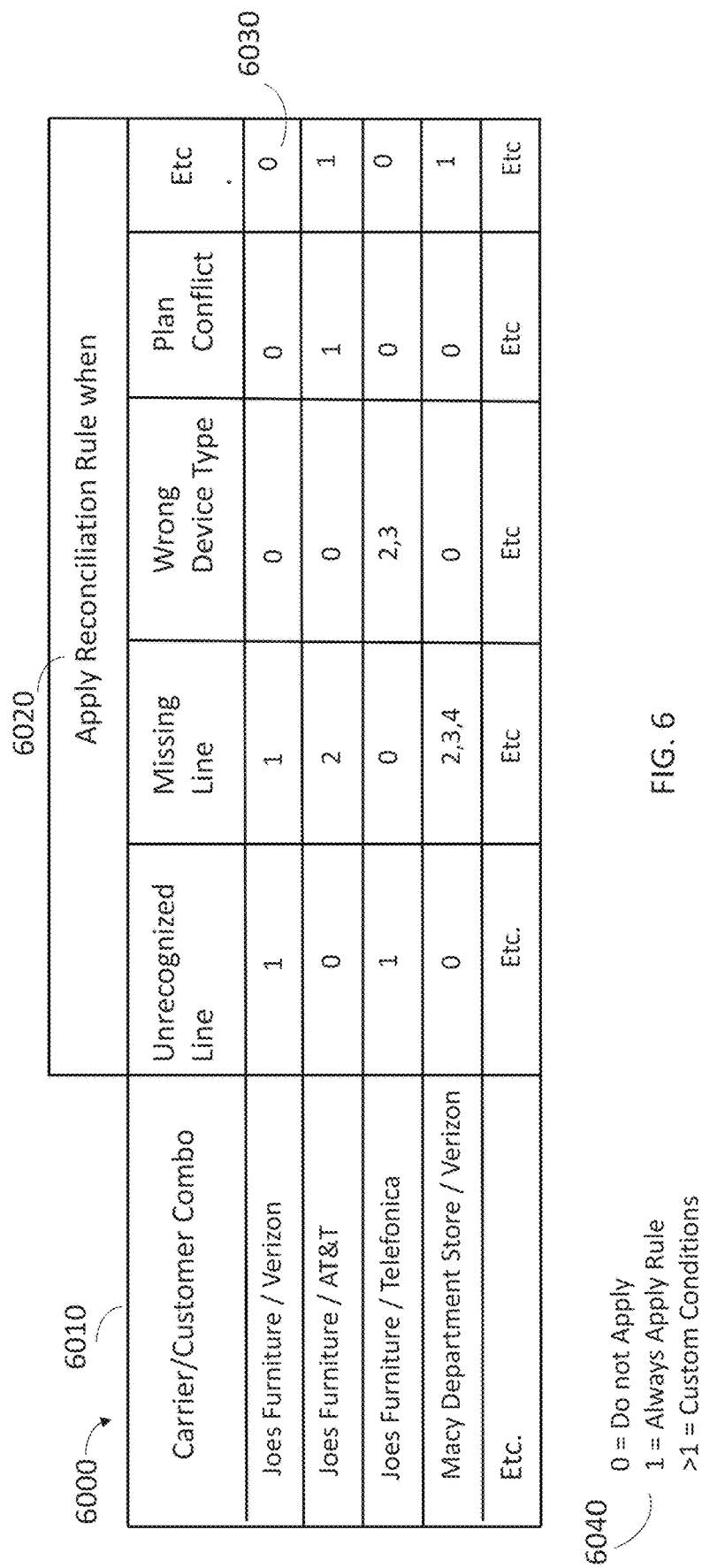
FIGS. 6 and 7 shows a sample configurable rule definitions table used in the system of FIG. 1

Turning now to FIG. 6, we see a sample configuration table for customizable rules by customer (6000). The rows (6010) are a combination of customer and carrier account. Example, a given customer may have three carriers they use, each one will have a separate row as some rules are carrier specific.

The columns (6020) are the individual rule sets. Some examples are shows such as a missing line, an unrecognized line, a wrong device type etc. The list is not meant to be exhaustive and is simply shown as an example.

Within each cell (6030) represented by a row (6010) and a column (6020) we see one or more values. These values in the cells (6030) represent the conditions to be met to apply the rule. For example, a 0 represents do not apply the rule for the given condition. For example, a 0 for Joes Furniture Verizon for the Wrong Device Type rule means do not do anything if this occurs. A 1 represents apply the rule set under all conditions This means that every time the condition occurs, the rule action will take place.

Figure 7:
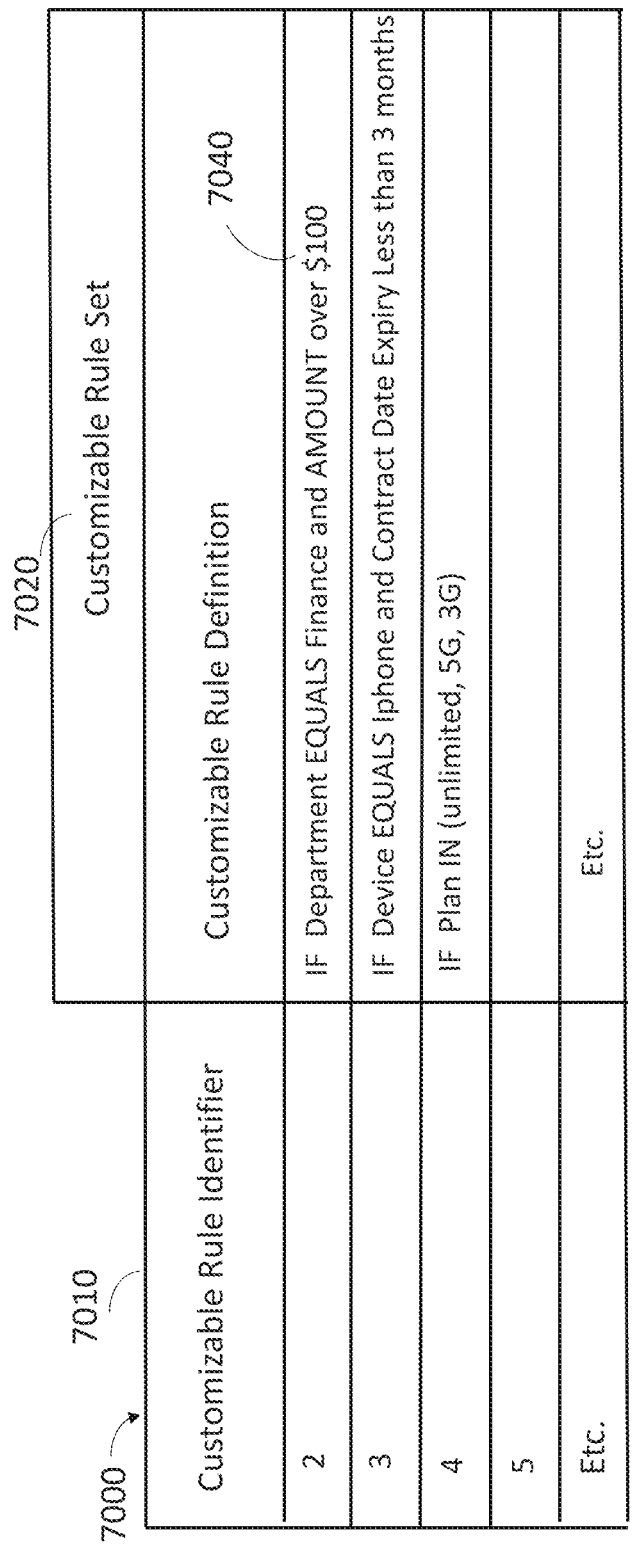

Numbers larger than 1 are customized rule conditions create by the customer. They can be programmed using rules (6040) using a language that applied mathematical and logical operators to values and variables. For example, IF a variable X has a value of Y or if variable X is EQUAL to another variable, THEN apply a given rule. Any number of possibilities can be programmed using such an approach allowing for customizable, automated reconciliation. Turning to FIG. 7 we see such a customizable rule definition table (7000) where rows are the rule identifiers (7010) corresponding to the values in the cells (6030) in the Rule definition table (6000) in FIG. 5. The rule definition (7040) is the mathematical and logical definition when equates to a TRUE or FALSE condition determining whether to apply the reconciliation rule.

Figure 8:
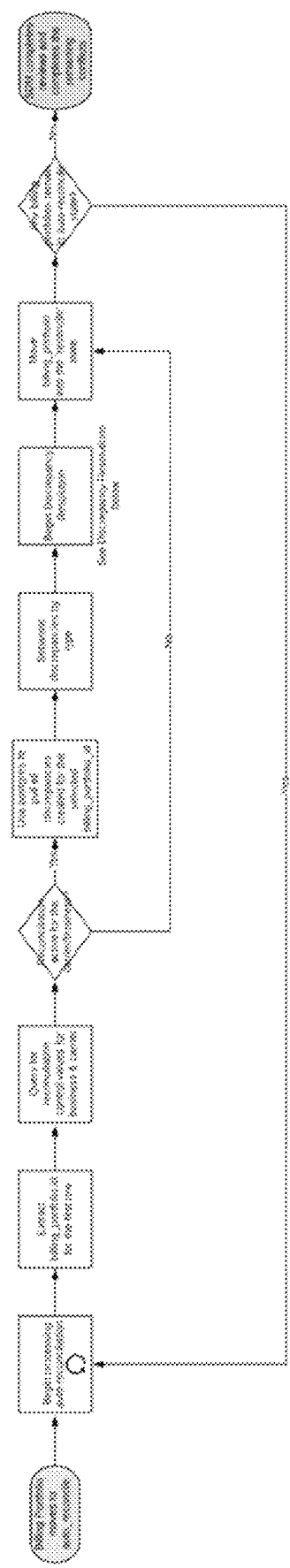
FIG. 8 shows a high level flow chart overview of the device information reconciliation process.
Figure 9:
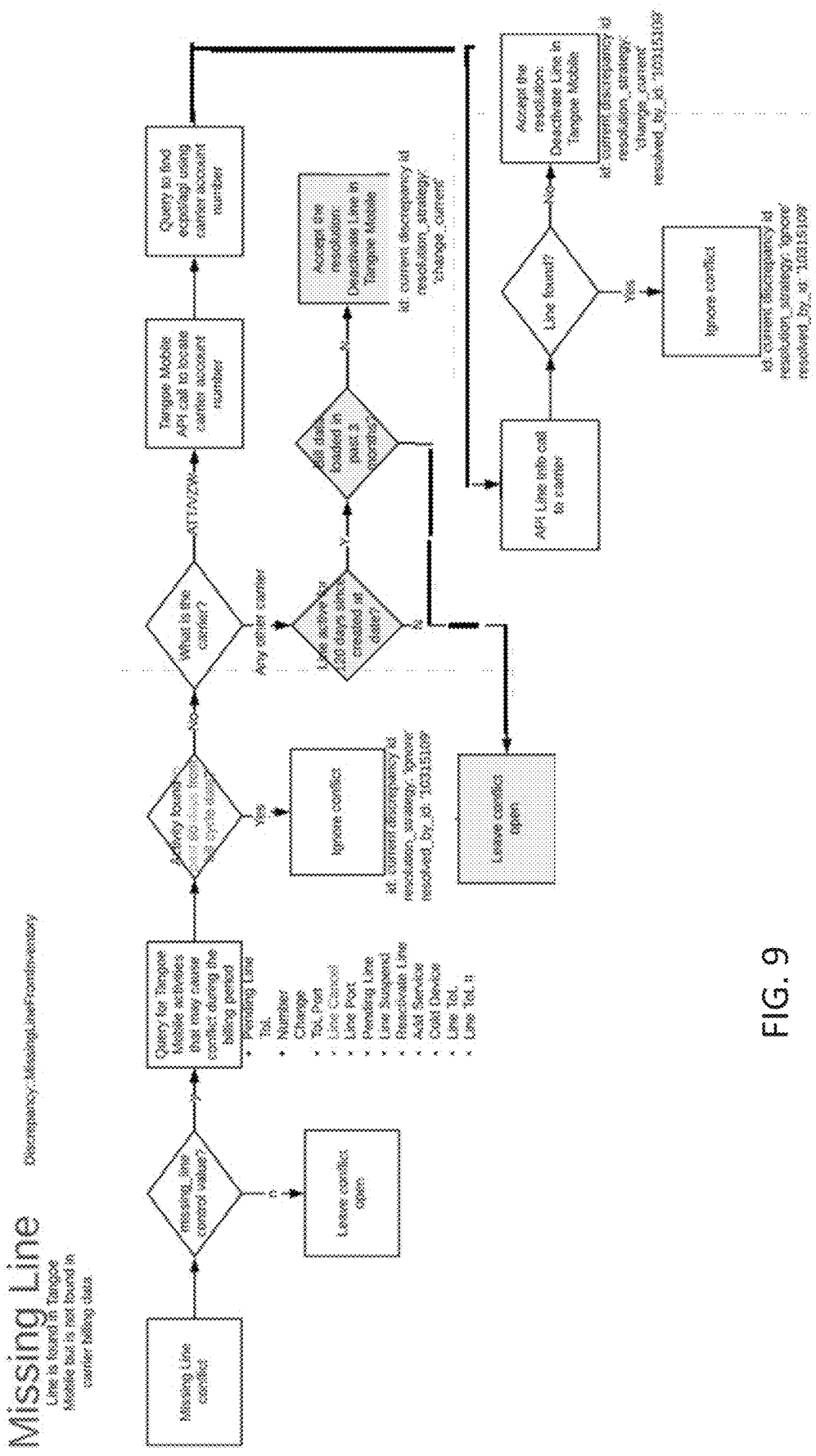
FIG. 9 shows a flow chart for how missing lines are identified and reconciled in that line is found in the TEM system store but not in the carrier data.
Figure 10:
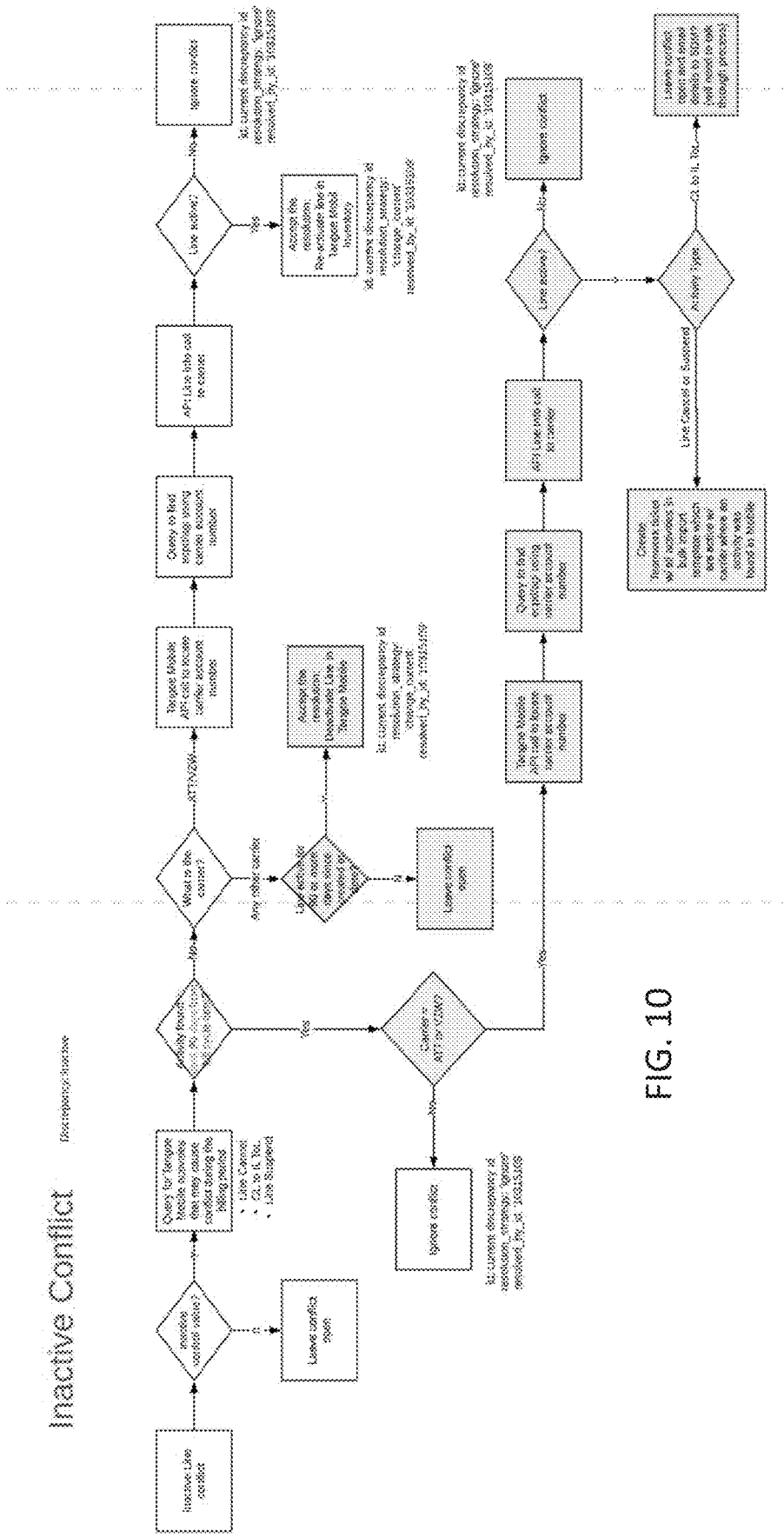
FIG. 10 shows a flow chart of how conflicts of inactive lines in the TEM system are reconciled when identified/active in the carrier bill.
Figure 11:
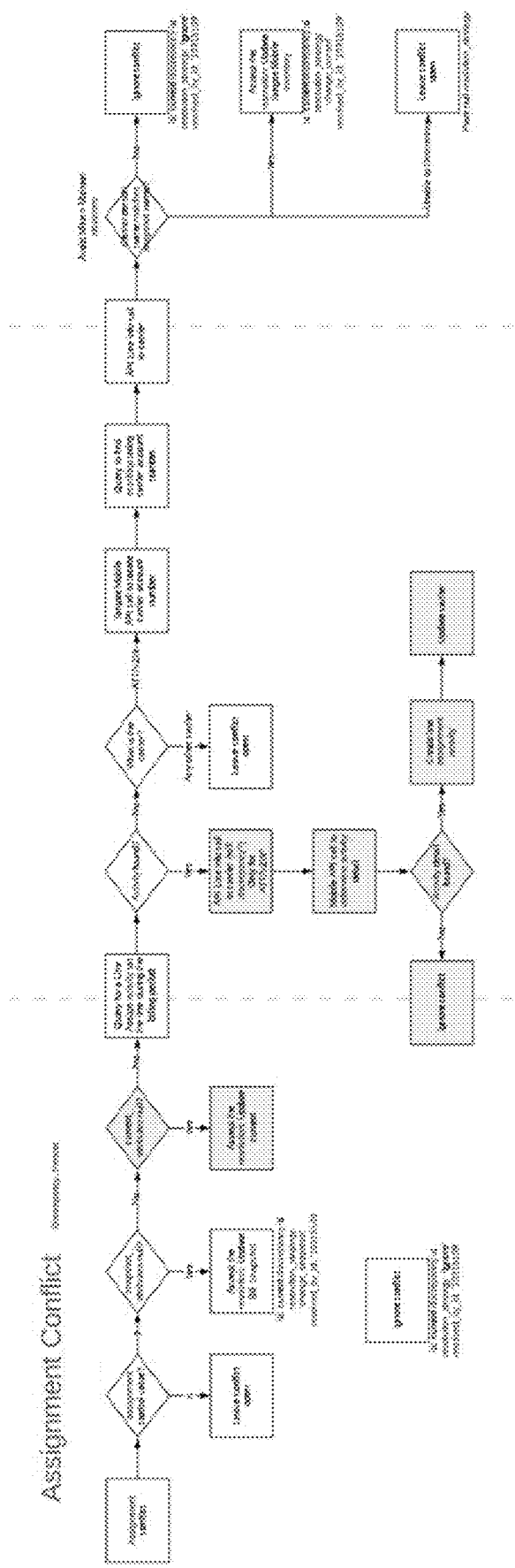
FIG. 11 shows a flow chart of how device information is reconciled when the TEM system store shows a different line owner than the carrier data.
Figure 12:
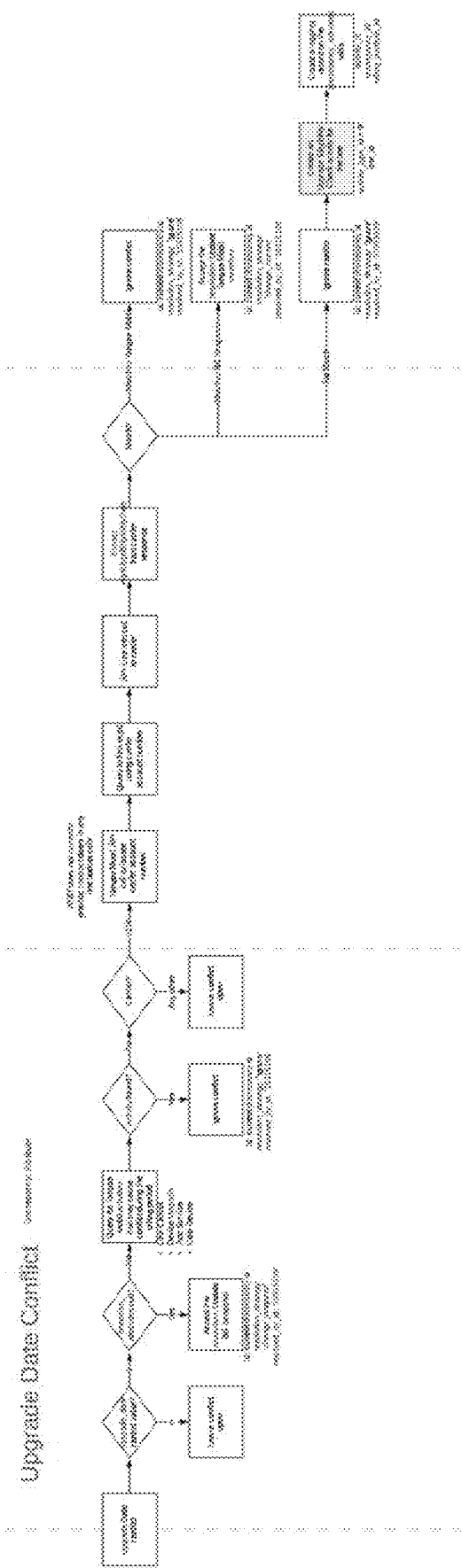
FIG. 12 is a flow chart which shows how conflicts are resolved when upgrade dates do not match between the TEM and carrier systems.
Figure 13:
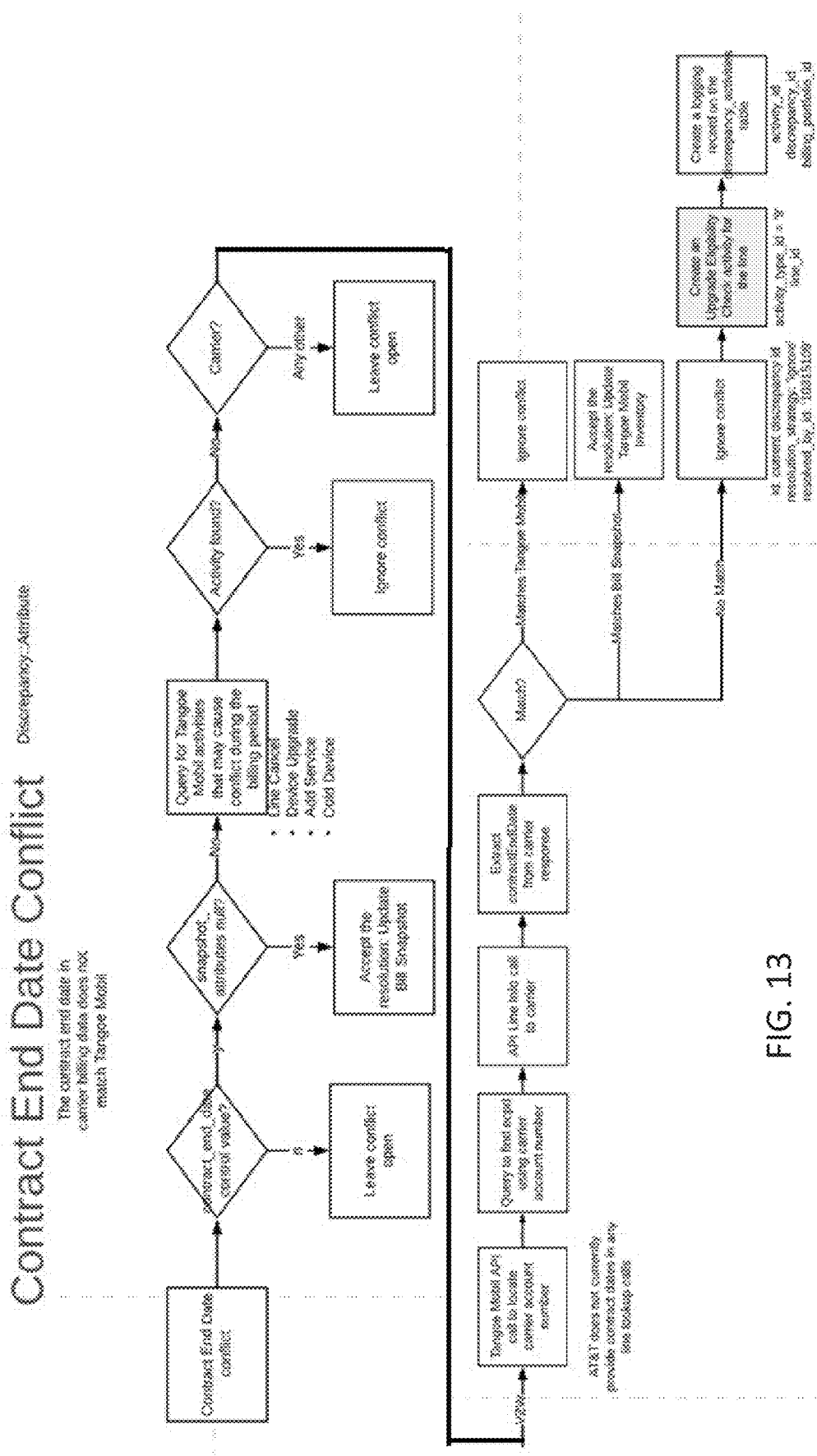
FIG. 13 shows a flow chart of how contract end date conflicts are reconciled.
Figure 14:
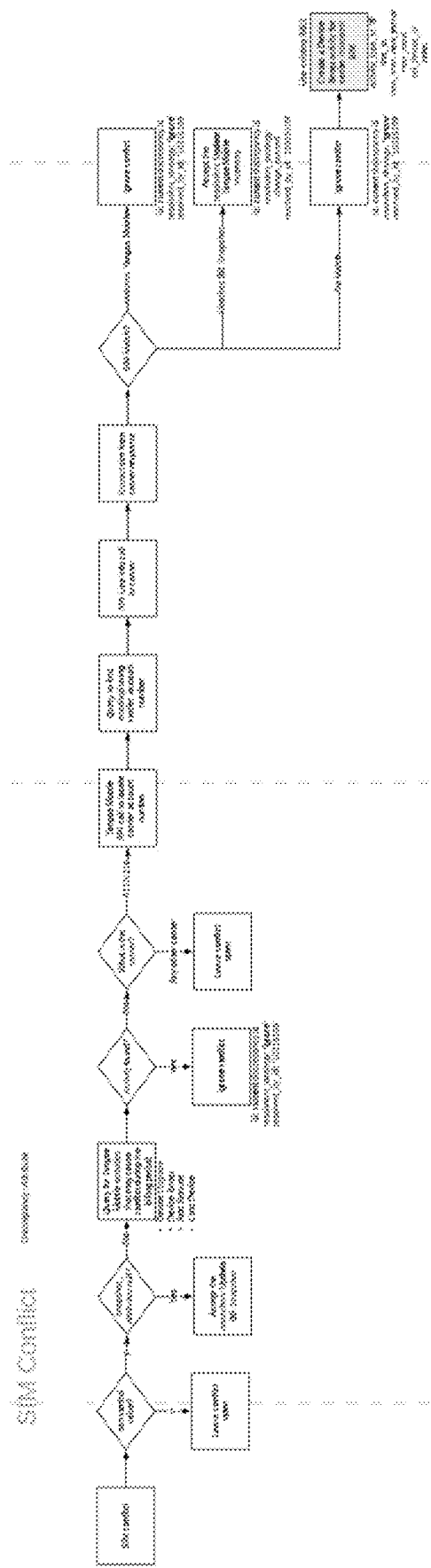
FIG. 14 shows a flow chart of how SIM conflicts are resolved.

FIG. 8 shows a high level flow chart overview of the device information reconciliation process. FIG. 9 shows a flow chart for how missing lines are identified and reconciled in that line is found in the TEM system store but not in the carrier data. FIG. 10 shows a flow chart of how conflicts of inactive lines in the TEM system are reconciled when identified/active in the carrier bill, FIG. 11 shows a flow chart of how device information is reconciled when the TEM system store shows a different line owner than the carrier data. FIG. 12 is a flow chart which shows how conflicts are resolved when upgrade dates do not match between the TEM and carrier systems. FIG. 13 shows a flow chart of how contract end date conflicts are reconciled. FIG. 14 shows a flow chart of how SIM conflicts are resolved. These are but a few non-limiting examples of how device information is updated and conflicts are reconciled. For the avoidance of doubt, all of these processes are implemented by the RPA computer program 300 which implements device information 1030 updates at the TEM system store.

While the invention is susceptible to various modifications, and alternative forms, specific examples thereof have been shown in the drawings and are herein described in detail. Is should be understood however that the invention is not to be limited to the particular forms or methods disclosed but to the contrary, the invention is to cover all modifications, equivalents and alternatives falling within the scope of the disclosures and/or claims.

What is claimed is:

1. A method of managing telecommunications devices comprising:
providing software executing on a computer, the software communicates with a plurality of telecommunications devices, each telecommunications device having device information associated therewith in a data store, the device information including device identification information and information indicative of one or more telecommunications plans for each telecommunications device wherein the data store is separate from each data store of a plurality of telecommunications provider servers;
determining a time for an expected run of a computer program which makes changes to telecommunications plans of one or more of the plurality of devices to reduce costs based on measured telecommunications usage of the plurality of devices;
prior to said run time and with said software, obtaining updated device information via a telecommunications network from each of said plurality of telecommunications devices and updating data records in data store with the updated device information such that the device information is up to date;
after obtaining said updated device information, running the computer program to determine changes to the telecommunications plans of the one or more of the plurality of devices based on the measured usage by using the device information which is up to date due to the obtaining step and the computer program modifying the telecommunications plans of the one or more of the plurality of devices by transmitting a request to at least one of the plurality of the telecommunications provider servers.

2. The method of claim 1 wherein the computer program is part of the software.

3. The method of claim 1 wherein the computer program executes on a second computer which is different than the computer.

4. The method of claim 1 wherein the computer program executes on the computer.

5. The method of claim 1 wherein the device identification information indicative of group consisting of: device operating system, IMEI number, MEI number, SIM card number and combinations thereof.

6. The method of claim 1 wherein the updated device information is indicative of a change of device type for at least one of the plurality of telecommunications devices.

7. The method of claim 1 wherein the updated device information changes eligibility of that device for one or more telecommunications plans available for the computer program to select from.

8. The method of claim 1 further comprising: also prior to said run time and with said software, obtaining updated device information via a telecommunications network from the telecommunications provider server and comparing the updated device information from the telecommunications provider server with the updated device information from each of said plurality of telecommunications devices and reconciling the two to determine and make updates to the data records in the data store.

9. A method of managing telecommunications devices comprising:
providing software executing on a computer which communicates with a plurality of telecommunications provider servers which each communicate with a group of a plurality of telecommunications devices, each telecommunications device having device information associated therewith in a data store, the device information including device identification information and information indicative of one or more telecommunications plans for each telecommunications device wherein the data store is separate from each data store of the plurality of telecommunications provider servers;

determining a time for an expected run of a computer program which makes changes to telecommunications plans of one or more of the plurality of telecommunications devices to reduce costs based on measured telecommunications usage of the plurality of devices;

prior to said expected run and with said software, obtaining updated device information via a telecommunications network from one or more of the plurality of telecommunications provider servers and updating data records in data store with the updated device information such that the device information is up to date;

after obtaining said updated device information, running the computer program to determine changes to the telecommunications plans of the one or more of the plurality of devices by using the device information which is up to date due to the obtaining step and the computer program modifying the telecommunications plans of the one or more of the plurality of devices by transmitting a request to at least one of the plurality of telecommunications provider servers.

10. The method of claim 9 wherein said software obtains updated device information for one device from at least two data stores such that the updated device information from one of the two data stores conflicts with the updated device information from another of the two data stores.

11. The method of claim 9 wherein said software delays transmission of device information to the computer program until update device information is received.

12. The method of claim 9 wherein the device identification information indicative of group consisting of: device operating system, IMEI number, MEI number, SIM card number and combinations thereof.

13. The method of claim 9 wherein the updated device information is indicative of a change of device type for at least one of the plurality of telecommunications devices.

14. The method of claim 9 wherein the updated device information changes eligibility of that device for one or more telecommunications plans available for the computer program to select from.

15. A method of managing telecommunications devices comprising:

providing software executing on a computer which identifies a request to change or add a telecommunications plan for one or more of a plurality of telecommunications devices;

said software upon receiving the request communicates with one or more data stores over one or more networks, the data stores having telecommunications plan information and device information stored thereon, the device information including device identification information indicative of device type and the telecommunications plan information indicative of active lines wherein the data stores comprise data stores selected from the group consisting of: data stores which are part of the one or more of the plurality of telecommunications devices, telecommunications provider data stores, user identification data stores and combinations thereof;

said software, prior to transmitting a response to said request to change or add the telecommunications plan, obtaining updated device from the one or more data stores and updating data records in a system data store with the updated device information such that the device information is up to date;

after obtaining said updated device information, running the computer program to determine changes or additions the telecommunications plans of the one or more of the plurality of devices based on the updated device information in the system data store and the computer program modifying the telecommunications plans of the one or more of the plurality of devices by transmitting a request to at least one of a plurality of telecommunications provider servers after obtaining said updated device information.

16. The method of claim 15 wherein said request to change or add a telecommunications plan is generated by a computer program which makes changes to telecommunications plans of one or more of the plurality of telecommunications devices to reduce costs based on measured telecommunications usage of the plurality of devices.

17. The method of claim 16 wherein said request to change or add a telecommunications plan is transmitted to a telecommunications provider server which is associated with the telecommunications provider data store.

18. The method of claim 15 wherein the user identification data store is associated with a human resources identification system computer.

19. The method of claim 15 further comprising a request to change or add a telecommunications plan is transmitted from a procurement program to a telecommunications provider server for a new telecommunications line.

20. The method of claim 19 wherein the new telecommunications line is a data only line.

* * * * *